United States Patent [19]

Wills et al.

[11] Patent Number: 4,898,530

[45] Date of Patent: Feb. 6, 1990

[54] METHOD OF OPERATING A PAIR OF BURNERS AND APPARATUS FOR USE IN THE METHOD

[75] Inventors: Brian Wills, Kinver; Gary Johns, Wolverhampton, both of United Kingdom

[73] Assignee: Stordy Combustion Engineering Limited, Wolverhampton, United Kingdom

[21] Appl. No.: 127,666

[22] PCT Filed: Mar. 27, 1987

[86] PCT No.: PCT/GB87/00212

§ 371 Date: Jan. 14, 1988

§ 102(e) Date: Jan. 14, 1988

[87] PCT Pub. No.: WO87/05988

PCT Pub. Date: Oct. 8, 1987

[30] Foreign Application Priority Data

Mar. 27, 1986 [GB] United Kingdom ............... 8607810

[51] Int. Cl.⁴ ............................................. F23L 15/04
[52] U.S. Cl. ......................................... 431/11; 431/12; 431/4; 431/215; 432/181; 423/237
[58] Field of Search ................... 431/12, 3, 4, 11, 215; 423/235, 236, 237; 432/181, 182

[56] References Cited

U.S. PATENT DOCUMENTS

| | | | |
|---|---|---|---|
| 1,606,927 | 11/1926 | Dyrssen | 432/4 |
| 4,216,060 | 8/1980 | Murata et al. | 432/72 X |
| 4,328,020 | 5/1982 | Hughes | 65/27 |
| 4,372,770 | 2/1983 | Krumwiede et al. | 110/210 X |
| 4,427,362 | 1/1984 | Dykema | 431/4 |
| 4,521,389 | 6/1985 | Blanton, Jr. et al. | 423/235 |
| 4,540,361 | 9/1985 | Gagne | 432/181 X |
| 4,599,100 | 7/1986 | Demarest, Jr. | 65/134 |

FOREIGN PATENT DOCUMENTS 3431961 3/1985 Fed. Rep. of Germany .

Primary Examiner—Carl D. Price
Attorney, Agent, or Firm—Parmelee, Miller, Welsh & Kratz

[57] ABSTRACT

A pair of regenerative burners is provided with feed means (25) for feeding a reducing agent into the products of combustion so that this agent can reduce oxides of nitrogen in the heat store to which heat is imparted by the products of combustion. Refractory elements (17,21) comprised by the heat stores may additionally or alternatively have catalytically active surfaces to promote reaction of the lower oxides of nitrogen.

3 Claims, 1 Drawing Sheet

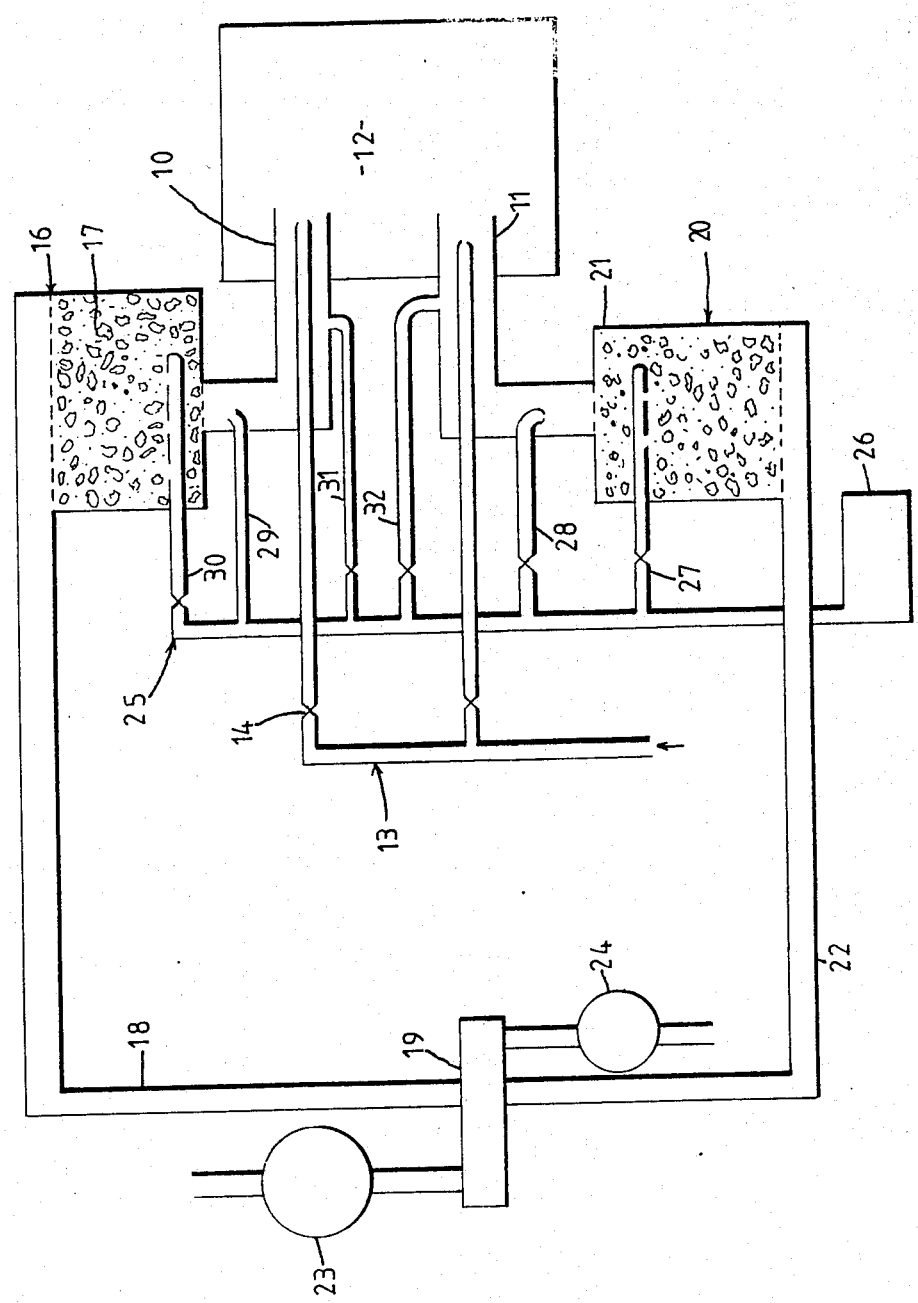

METHOD OF OPERATING A PAIR OF BURNERS AND APPARATUS FOR USE IN THE METHOD

The present invention relates to the combustion of fuel using regenerative burners. A regenerative burner has a heat store used to cool products of combustion and, subsequently, to impart heat to air which is to be used for combustion. Regenerative burners are normally used in pairs, the burners of the pair being operated alternately. In a first part of a cycle of operation, air flows through the heat store of one burner and is discharged from the burner with fuel into a combustion space which is common to the pair of burners. Hot products of combustion pass from the combustion space through the heat store associated with the other burner and transfer heat to that heat store. In the second part of the cycle, the direction of the air flow is reversed and air flows through the hot heat store to the combustion space, being heated by heat exchange with the heat store so that heat recovered from the products of combustion during the first part of the cycle is returned to the combustion space. This results in efficient operation, by which we mean that the products of combustion carry to the atmosphere a relatively small proportion of the heat released by combustion of the fuel. A disadvantageous consequence is that the temperature attained in the combustion space is relatively high. This promotes the formation of oxides of nitrogen.

The combustion space may comprise distinct parts, for example a furnace chamber where workpieces are heated and two smaller spaces, adjacent to respective ones of the burners, where much of the combustion takes place.

It is an object of the present invention to avoid emission to the atmosphere of exhaust gases containing significant proportion of lower oxides of nitrogen.

According to a first aspect of the invention, there is provided a method of operating a burner wherein combustion air is passed through heat storage means to the burner, fuel is discharged from the burner with the combustion air and burns in a combustion space, hot products of combustion are passed from the combustion space through the heat storage means separately from the combustion air passing to the burner, heat is transferred from the products of combustion to the heat storage means and that heat is subsequently transferred to combustion air which is passed through the heat storage means, characterised in that a reducing agent is introduced into the products of combustion before said products leave the heat storage means and in that, before the products of combustion leave the heat storage means, the reducing agent reduces oxides of nitrogen present in the products of combustion.

The temperature in the heat storage means will vary with time and/or with the position at which the temperature is measured. In a case where, during a part of a cycle of operation, the products of combustion are directed along a path which extends through the heat storage means, the temperature at a selected position along that path will increase during that part of the cycle. At any instant, there will be a temperature gradient along that path. If, during a subsequent part of the cycle, cool combustion air is directed along that path through the heat storage means, the temperature at the selected position along the path will fall and there will be a different temperature gradient along the path at a selected moment during the subsequent part of the cycle.

The position at which the reducing agent is introduced into the products of combustion may be selected according to the temperature conditions to ensure that the mixture comprising reducing agent and oxides of nitrogen is at an appropriate temperature for the required reduction to occur before the gases leave the heat store.

A proportion of the products of combustion may be re-cycled to the combustion space to dilute the air and fuel discharged into the combustion space.

Reduction of the oxides of nitrogen preferably occurs whilst said oxides are in contact with surfaces of refractory elements in the heat store or with surfaces defining the flowpath between the combustion space and the heat storage means. The reduction may be promoted by contact with those surfaces and the surfaces of the refractory elements may be adapted to promote the required reactions.

The mixture comprising the products of combustion and the reducing agent may be directed into a bed of refractory elements comprised by the heat storage means. Flow of the gaseous mixture through such a bed promotes mixing of the gases. Alternatively, the reducing agent may be introduced into the products of combustion at a position within a bed of refractory elements comprised by the heat store. With this alternative procedure, the products of combustion may be cooled somewhat by the bed before being admixed with the reducing agent.

According to a second aspect of the invention, there is provided apparatus suitable for carrying out the method of the first aspect and comprising a burner arranged for discharging fuel and air into a combustion space, heat storage means so associated with the burner that air can flow through the heat storage means and through the burner to the combustion space and that products of combustion can flow from the combustion space through the heat storage means, characterised by feed means for introducing a reducing agent into the flow of products of combustion from the combustion space at one or more positions between the combustion space and an outlet through which the products of combustion leave the heat storage means.

The heat storage means may comprise two or more distinct heat stores, for example one heat store for each of a number of burners is incorporated in the apparatus. Alternatively, there may be provided a single heat store, the combustion air and the hot products of combustion being directed along respective paths through the heat store and the paths being moved relative to the heat store so that each path scans the heat store during a cycle of operation.

The feed means preferably includes valves for controlling introduction of the reducing agent and control means is preferably provided for controlling the valves of the feed means in accordance with the selection of the flow path of products of combustion from the combustion space.

The feed means may be arranged for feeding the reducing agent into the products of combustion selectively at different positions, in which case the control means is preferably adapted to control the position or positions at which the reducing agent is introduced into the products of combustion in accordance with the temperature at one or more predetermined positions.

An example of apparatus embodying the second aspect of the invention and which is used in a method according to the first of the invention will now be described, with reference to the accompanying drawing, which shows a diagrammatic representation of the apparatus.

The apparatus illustrated in the drawing comprises a pair of burners 10 and 11, each of which is arranged for discharging fuel and air into a common combustion space 12. The combustion space may be the interior of a furnace or the interior of a radiant heating element. Fuel supply means is provided for supplying fluid fuel to the burners. The fuel supply means includes ducts 13 extending from a supply of fuel, for example a natural gas main, to the burners and appropriate valve 14 and 15 for controlling flow of fuel to the burners. By way of example, two only valves are shown in the fuel supply means but a larger number of valves would normally be provided, some being intended to exercise control over the fuel flow rate and others intended to prevent the supply of fuel to a burner unless it is appropriate and safe for fuel to be supplied to that burner.

There is associated with the burner 10 a heat store 16 comprising a vessel which contains a bed of refractory elements 17. At one of its ends, the vessel communicates with the burner 10 and at is opposite end the vessel communicates through a duct 18 with a change-over valve 19. A similar vessel 20 containing a bed 21 of refractory elements is associated with the burner 11 and conected with the changeover valve by a duct 22. Combustion air supply means of the apparatus comprises a fan 23 arranged for blowing air along one or other of the ducts 18 and 22 through one or other of the heat stores to the corresponding burner. There is also provided an exhaust fan 24 for drawing products of combustion through one of the burners and the associated heat store and discharging such products of combustion to the atmosphere.

The vessels 16 and 20 may be steel vessels and may have thermally insulated walls. The refractory elements contained in these vessels, or at least some of these refractory elements, are preferably ceramic bodies. The size of each ceramic body is small, as compared with the volume of the vessel in which it is disposed.

The parts thus far described may be constructed and arranged in a known manner. Furthermore, there would be provided for each burner a pilot burner which will ignite fuel discharged from the burner into the combustion space 12. The apparatus includes a control system comprising appropriate sensors, timing devices and valves for operating the burners alternately and checking that the conditions of operation are safe. The control means may comprise a micro-processor.

When the apparatus is brought into operation, the refractory elements in both of the heat stores may be cold. The valve 19 is set to direct air from the fan 23 along the duct 18 to the burner 10 and fuel is discharged with air from this burner into the combustion space 12 and is ignited by the associated pilot burner. The valve 19 also directs products of combustion from the combustion space 12, through the burner 11 and the heat store 20 to the exhaust fan 24. After a period of operation, which may be a predetermined period (for example a period within the range 1 to 4 minutes) or which may be such period as is required to attain a predetermined temperature at a predetermined position in the apparatus, the valve 19 is operated to bring to an end a first part of the cycle. During the first part of the cycle, hot products of combustion give up heat to the ceramic elements 21 in the heat store 20 and are thereby cooled, so that the exhaust fan 24 is not subjected to excessively high temperatures.

During the second part of the cycle, the valve 19 directs air from the fan 23 through the duct 22 and the heat store 20 to the burner 11. Fuel is discharged with the air from this burner into the combustion space and is ignited by the associated pilot burner. Air which flows through the heat store 20 is heated by contact with the hot, refractory element 21 and these elements are cooled. The cycle is brought to an end by operation of the valve 19 when either the predetermined period has elapsed or a predetermined temperature has been attained at a further predetermined position in the apparatus. During the second part of the cycle, hot products of combustion pass through the burner 10 to the heat store 16 and impart heat to the refractory elements 17 before passing to the exhaust fan 24.

Heating in the manner described hereinbefore of combustion air which flows to a burner results in a relatively high flame temperature being attained. This results in significant formation of oxides of nitrogen. The apparatus includes means for reacting at least lower oxides of nitrogen to reduce the concentration thereof in gases discharged to the atmosphere.

The apparatus includes feed means 25 for feeding a reducing agent into the hot products of combustion. The feed means includes a bulk supply 26 of the reducing agent and a number of ducts, examples of which are indicated by the reference numbers 27 to 32 for discharging the reducing agent into the paths along which products of combustion flow from the combustion space 12 to the valve 19 at alternative positions along those paths. Valves are provided for controlling flow along the ducts 27 to 32. These valves are incorporated in the control means and subjected to control by the microprocessor.

When the burner 10 is firing and hot products of combustion leave the combustion space 12 through the burner 11, reducing agent may be discharged into those products of combustion in the burner 11 through the duct 32 or through the duct 28 between the burner and the heat store 20 or into the heat store through the duct 27. Flow of the gaseous mixture through the burner, from the burner to the heat store and through the heat store promotes mixing of the gases so that the reducing agent is distributed throughout the products of combustion. It will be understood that the reducing agent is a gas, at least at the temperatures prevailing in the passage connecting the burner 11 with the heat store 20. Oxides of nitrogen are reduced by the reducing agent in the burner, in the passage connecting the burner with the heat store and in the heat store so that the concentration of oxides of nitrogen in the gases passing through the exhaust fan 24 are small, as compared with the concentration present in the combustion space 12.

The reducing agent may be supplied through different ones of the ducts 27, 28 and 32 at different stages of each cycle of operation, in accordance with variations in the temperature at selected positions in the apparatus during that cycle. Alternatively, the reducing agent may be supplied through one only of the ducts 27, 28 and 32 to a position where the temperature conditions are suitable for reduction of oxides of nitrogen. In this case, the other two ducts may be omitted from the apparatus.

Whilst a single duct for discharging reducing agent in the bed of elements 21 has been illustrated, a number of alternative ducts for introducing the reducing agent at a selected one of several alternative positions in the bed may be provided. Information received by the microprocessor from temperature sensing devices at appropriate positions may be used to determine the position at which the reducing agent should be introduced into the products of combustion.

When flow of products of combustion from the combustion space 12 through the burner 11 to the heat store 20 is terminated, feeding of reducing agent into the bed of refractory elements 21 or via the duct 28 is also terminated. During the next half cycle, reducing agent is fed through either the duct 29 or the duct 30 or the duct 31 to mix with products of combustion flowing from the combustion space 12 into the heat store 16.

A suitable reducing agent is ammonia. The bulk supply 26 of ammonia may be liquified ammonia or an aqueous solution of ammonia.

In adition to, or as an alternative to mixing of a reducing agent with the products of combustion, oxides of nitrogen contained in the products of combustion may be reacted on surfaces of the elements 17 and 21. The composition and surface properties of these elements may be such as to promote the required reactions of oxides of nitrogen with a reducing agent added downstream of the combustion space or with oxygen or other gaseous substance present in the combustion space. For example, reducing agents may be produced during combustion of the fuel and subsequently reacted with the oxides of nitrogen on the surfaces of the elements 17 and 21 or surfaces of the burners 10 and 11 or surfaces defining the passages which connect these burners with the heat stores. Additionally or alternatively, at least some of the refractory elements may bear a surface coating of a catalyst for the required reactions.

At least in a case where a reducing agent is introduced into the products of combustion, the residence time of the gases in the heat store is in excess of 0.05 seconds. The temperature at the position where the reducing agent is introduced into the products of combustion is preferably no greater than 1000° C. or the reducing agent is introduced at a position close to the bed of refractory elements so that the gases are cooled rapidely after the reducing agent has been introduced.

The flow rate of the reducing agent is small, as compared with the rate at which the products of combustion flow from the combustion space. The relation between the concentration of the reducing agent and the concentration of oxides of nitrogen in the products of combustion is preferably at least approximately stoichiometric. The volume of the products of combustion to which the reducing agent is added is preferably at least 200 times the volume of the reducing agent. A few parts of the reducing agent may be added to each million parts of products of combustion.

The gases for example, the gases may be cooled to a temperature below 500° C. within 0.2 seconds of addition of the reducing agent. The concentration of the oxygen in the gases to which the reducing agent is introduced is preferably no greater than 1%.

The apparatus illustrated in the accompanying drawing may be modified by omission of the burner 11 and substitution for the heat stores 16 and 20 of a single heat store through a first part of which combustion air is supplied to the burner 10 and through a second part of which products of combustion are exhausted from the combustion space 12 to the duct 22. The heat store may be arranged for rotation so that the stream of combustion air and the stream of products of combustion both scan the heat store once during each cycle of operation. A known example of such a rotating heat store is called in the art a "heat wheel". During use of such modified apparatus, the flow of gases may take place always in the same direction and may be without interruption.

The features disclosed in the foregoing description, or the accompanying drawings, expressed in their specific forms or in terms of a means for performing the disclosed function, or a method or process for attaining the disclosed result, as appropriate, may, separately or any combination of such features, be utilised for realising the invention in diverse forms thereof.

We claim:

1. A method of operating a pair of burners cyclically wherein, during a first part of each cycle, air is passed through a first heat store to a first of the burners, fuel is discharged from the first burner with the air and burns in a combustion space, hot products of combustion are passed from the combustion space through a second heat store associated with the second burner and heat is transferred from the products of combustion to the second heat store, wherein during a second part of each cycle, air is passed through the second heat store, is heated therein, is discharged from the second burner with fuel into the combustion space to burn therein and the hot products of combustion flow from the combustion space through the first burner and then through the first heat store to impart heat to the latter, wherein a reducing agent is introduced into the products of combustion at said first burner and wherein, before the products of combustion leave the first heat store, the reducing agent reduces oxides of nitrogen present in the products of combustion.

2. Apparatus suitable for carrying out the method of claim 1 and comprising means defining a combustion space, a first burner arranged for discharging fuel and combustion air into said space, first heat storage means so associated with the first burner that combustion air can flow through the first heat storage means and the first burner to the combustion space, when the first burner is firing, a second burner arranged for discharging fuel and combustion air into said space, second heat storage means so associated with the second burner that combustion air can flow through the second heat storage means and the second burner to the combustion space, when the second burner is firing, wherein the first burner also defines a path for the flow of products of combustion from the combustion space through the first heat storage means when the second burner is firing and the second burner also defines a path for the flow of products of combustion from the combustion space through the second heat storage means when the first burner is firing and wherein the apparatus further comprises first feed means for introducing a reducing agent at the first burner into the flow of products of combustion from the combustion space to the first heat storage means, second feed means for introducing a reducing agent at the second burner into the flow of products of combustion from the combustion space into the second heat storage means and control means for controlling operation of the feed means to introduce the reducing agent alternately through the first and second feed means to the products of combustion at one of said burners when the other of said burners is firing.

3. The method of claim 1 wherein the reducing agent is an aqueous solution of ammonia.

* * * * *